United States Patent [19]

Ross

[11] 4,138,897

[45] Feb. 13, 1979

[54] BALANCED CRANKSHAFT MECHANISM FOR THE TWO PISTON STIRLING ENGINE

[76] Inventor: Melvin A. Ross, 37 W. Broad St. #630, Columbus, Ohio 43215

[21] Appl. No.: 757,350

[22] Filed: Jan. 6, 1977

[51] Int. Cl.$^2$ .................... F16H 21/18

[52] U.S. Cl. .................... 74/45; 123/57 R; 60/525; 74/44

[58] Field of Search .................... 60/513, 520, 525; 123/57 R, 57 A, 57 B, 53 R, 53 AA, 53 BA, 192 B; 74/47, 45, 44

[56] References Cited

U.S. PATENT DOCUMENTS

| | | | |
|---|---|---|---|
| 333,644 | 1/1886 | Lochman | 60/577 |
| 1,460,475 | 7/1923 | Bronander | 123/53 B |
| 1,471,847 | 10/1923 | Holliday | 123/53 B |
| 2,619,943 | 12/1952 | Monleone | 123/192 B |
| 3,537,437 | 11/1970 | Paul et al. | 123/53 B |
| 3,845,624 | 11/1974 | Roos | 60/517 |

*Primary Examiner*—Benjamin W. Wyche
*Assistant Examiner*—Wesley S. Ratliff, Jr.

[57] ABSTRACT

A balanced crankshaft mechanism for the two piston Stirling engine which permits the use of a single crankpin and eliminates side forces on the pistons. A triangular yoke has connected to its respective apexes the connecting rods for each piston and the crankpin. One end of a rocking lever is connected to said yoke at a point between the points at which the connecting rods are attached. The other end of said rocking lever is connected to the base of the machine. As the crankpin rotates, the separate connecting rods and their respective pistons are moved with a phase relation appropriate for a two piston Stirling engine, and side forces are absorbed by the rocking lever, rather than by the pistons. A simple means of balancing the reciprocating inertial forces is described, which is also applicable to other types of Stirling engines.

6 Claims, 8 Drawing Figures

1
2
3
4
5
6
7
8
9
10
11
12
13
14
15
16
17
18
19
20
21
22
23
24
25
26
27

BALANCED CRANKSHAFT MECHANISM FOR THE TWO PISTON STIRLING ENGINE

BACKGROUND OF THE INVENTION

This invention provides a relatively simple means of providing the appropriate piston phasing for a two piston Stirling engine while eliminating the troublesome side forces on the pistons. It also permits both pistons to be driven by a common crankpin, at the same time retaining the advantageous parallel cylinder arrangement that is preferred for two piston Stirling engines. A method for balancing the reciprocating inertial forces of the engine with a single additional balance shaft is part of the invention, which method may be also useful in balancing other types of Stirling engines.

The single-acting two piston Stirling engine was well known in the last part of the nineteenth century, when it was generally referred to as the "Rider" engine, after its inventor, A. K. Rider. Its operation is amply described in the literature, and is conceptually identical to one power cycle unit of the four cylinder double-acting Stirling engine that is the focus of most present-day research and development. It is clear from the literature that the single-acting two piston engine is itself appropriate for certain power applications, but perhaps as important would be its use as an experimental "part engine" for the continuing development of the double-acting four cylinder engine.

It is widely recognized that side forces on the piston of the conventional crank and slider mechanism give rise to friction and lubrication difficulties when directly applied to simple Stirling engines. For long engine life, all traces of liquid lubricant must be excluded from the engine's power cylinders, and yet unlubricated pistons cannot absorb any appreciable side forces without causing excessive friction and wear. Separate crossheads have been used in some designs to separate the lubricated portion of the engine from the pistons and power cylinders, but on simple single-acting engines this approach unduly increases weight and complexity.

The aim of this invention is to provide a relatively simple crankshaft mechanism for the two piston Stirling engine which will allow the use of unlubricated pistons, without increasing friction or wear, by substantially eliminating side forces on the pistons. At the same time, parallel cylinders are retained, allowing desirably short passageways to connect the cylinders. The crankshaft requires only a single throw, and it may be light-weight and of extremely simple design and manufacture. The reciprocating inertial forces may simply be balanced by the generalized method of balance which is part of this invention.

Other aims, features, and advantages will be apparent in the description, below.

SUMMARY OF INVENTION

This invention is a balanced crankshaft mechanism for the single-acting two piston Stirling engine that requires only one crankpin, and that substantially eliminates piston side forces, while permitting the use of adjacent parallel cylinders. The mechanism for balancing the reciprocating inertial forces which is part of this invention is applicable to other types of Stirling engines as well as the one described.

In one example, a triangular yoke is connected at one of its apexes to the crankpin of a single crankshaft. The connecting rods from two pistons are connected respectively to the other apexes of the yoke, while one end of a rocking lever is connected to the yoke at a point midway between the apexes to which the connecting rods are attached. The other end of this rocking lever is connected to the crankcase or stationary base of the mechanism.

As the crankpin revolves, the rocking lever maintains the proper positioning for the upper portion of the yoke, and at the same time absorbs the side forces caused by the varying angularity of the yoke with respect to the crankshaft. The points of the yoke at which the connecting rods are connected move, in approximately linear fashion, with a phase relationship appropriate for a Stirling cycle machine. This phase relationship can easily be made 90°, for duplication of one cycle of the double-acting four cylinder Stirling engine.

DESCRIPTION OF THE PREFERRED EMBODIMENT

Figures 1, 2, 3, 4, 5, 6, 7, 8:
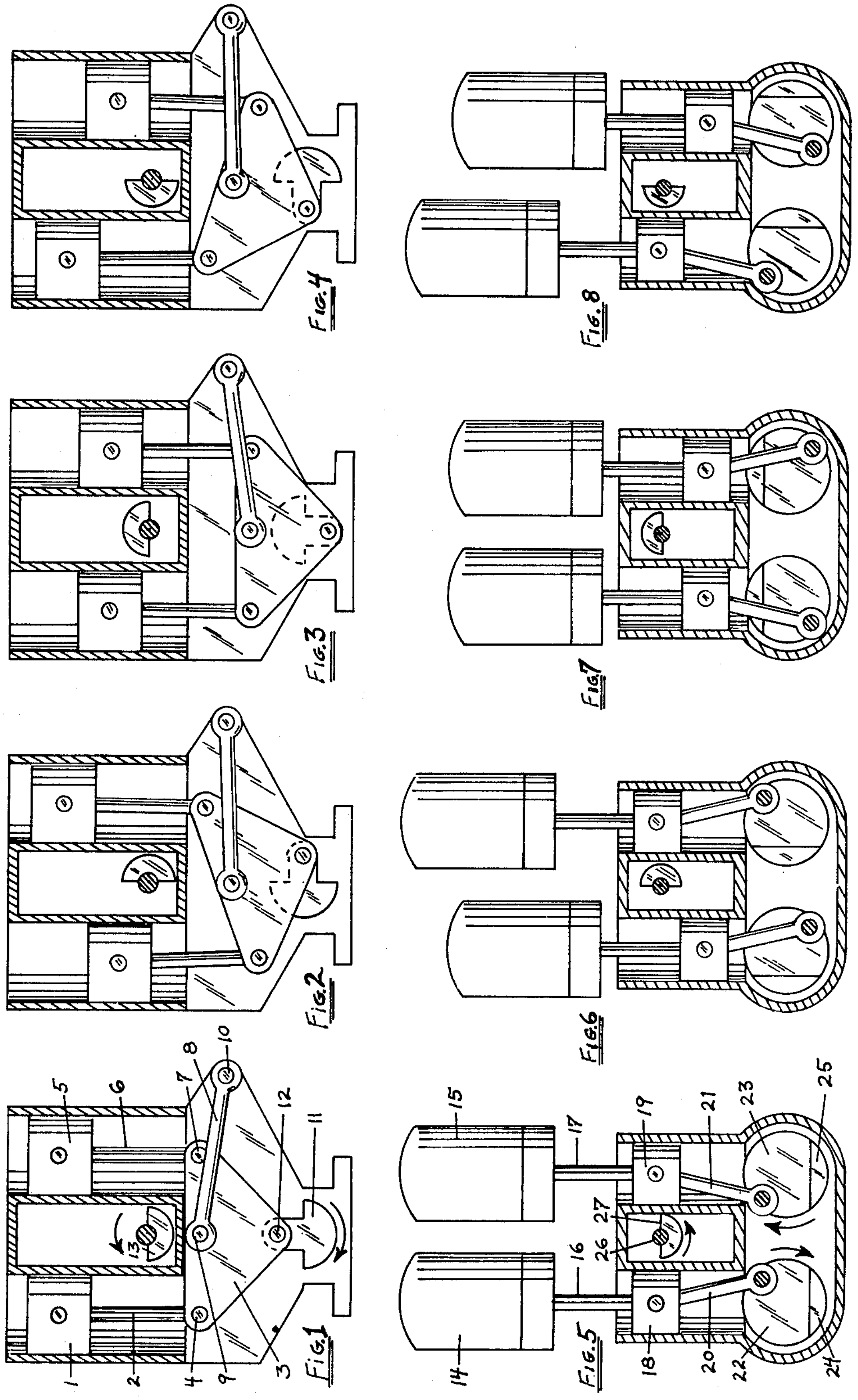
FIG. 1 is a schematic end view of the crankshaft mechanism constructed in accordance with this invention, with the crankpin at its top position.
FIG. 2 is the same view of the engine in FIG. 1 with the crankshaft advanced 90°.
FIG. 3 is the same view of the engine in FIG. 1 with the crankshaft advanced 180°.
FIG. 4 is the same view of the engine in FIG. 1 with the crankshaft advanced 270°.
FIG. 5 is a schematic end view of two cylinders of a four cylinder double-acting Stirling engine to which the balancing method included in this invention has been applied.
FIG. 6 is the same view of the engine in FIG. 5 with the crankshafts advanced 90°.
FIG. 7 is the same view of the engine in FIG. 5 with the crankshafts advanced 180°.
FIG. 8 is the same view of the engine in FIG. 5 with the crankshafts advanced 270°.

This invention is a balanced crankshaft mechanism for the single-acting two piston Stirling engine. In one example of such a mechanism the two cylinders are arranged so as to be parallel. They are mounted over a crankshaft with a single crankpin, the axis of which is perpendicular to the plane in which the axes of the cylinders lie. A triangular yoke which lies in the same plane as the cylinder axes is connected to the crankpin at one of its apexes. On the edge of this yoke opposite the crankpin is connected one end of a rocking lever, the other end of which pivots on a pin mounted on the crankcase or stationary base of the machine. The crankpin and this rocking lever together determine the motion of the yoke. To the remaining two apexes of the yoke are respectively connected the lower ends of the connecting rods from the pistons in the cylinders.

As the crankpin rotates the pistons are moved, with extremely low side forces, out of phase with each other. To obtain a 90° phase relationship between the pistons, it is only necessary to place the crankshaft equidistant between the extended cylinder axes, and to design the yoke so that; (a) the points of attachment of the crankpin and the two connecting rods are each equidistant from the point of attachment of the rocking lever; (b) the point of attachment of the rocking lever is in a line with the two points of attachment of the connecting rods; and, (c) the points of attachment of the connecting rods are equidistant from the point of attachment of the crankpin.

But the designer is by no means limited to a 90° phase relationship. By modifying the shape of the yoke, a wide variety of phase relationships and compression ratios is possible. For example, increasing the distance from the point on the yoke to which the rocking lever is attached to the crankpin will at once raise the compression ratio and reduce the phase angle between pistons.

The extremely low side forces on the pistons permit the use of unlubricated pistons. The friction in the mechanism will be in the crankpin and pivot pin bearings, and conventional anti-friction bearings may be used at these points with a minimum of lubrication. A dry, pressurized crankcase may be employed, which is a major advantage, particularly in a small simple Stirling engine.

The reciprocating inertia forces of the out-of phase pistons, as well as those of the yoke and rods, may be well balanced by the addition of a single balance shaft counter-rotating from the crankshaft. Conceptually, the reciprocating inertial forces to be balanced may be broken down into two types; those resulting from the vertical component of the crankpin motion, and those resulting from the horizontal component. To the extent the crankpin motion is vertical, the imbalance acts through the vertical centerline of the crankshaft. To the extent crankpin motion is horizontal the imbalance is a rocking couple acting vertically through the centerlines of the cylinders. Both the vertical imbalance and the rocking couple may be effectively counterbalanced by a pair of balance shafts counter-rotating between, and on the same plane as, the cylinder axes. Of couse, the crankshaft itself would normally be used, with appropriate balance weights attached, as one of these balance shafts.

In the version of the invention producing a 90° phase relation between the pistons, good dynamic balance may be obtained if the counter-rotating balance shaft is mounted vertically above the crankshaft at a distance equal to the distance between the cylinder axes, provided the following additional conditions are met: (a) the reciprocating masses associated with each cylinder are equal; (b) sufficient counterbalance mass is attached opposite the crankpin to fully balance all rotating masses, and the reciprocating masses associated with one cylinder; (c) sufficient counterbalance mass is attached to the balance shaft to fully balance all the reciprocating masses associated with one cylinder; and (d) the balance shaft is synchronized with the crankshaft so that their counterbalance masses act in the same direction only on the vertical plane passing through them.

The desired counterbalance mass referred to in phrases (b) and (c) of the preceding sentence is that required to fully balance the reciprocating masses as if they were rotating on the crankpin. It will be noticed that because of the motion of the yoke, the stroke of the pistons is $\sqrt{2}$ times longer than the throw of the crankpin; but the effect of the geometry described distributes the pistons' inertial forces into a rocking couple and a vertical imbalance which have a 90° phase difference between them, and the balance system described allows the same rotating counterbalance masses to counteract both the vertical imbalance and the couple. The 90° phase difference between the vertical imbalance and the rocking couple, and the fact that the same rotating counterbalance masses counteract both, effectively cancels out $\sqrt{2}$.

It is apparent that excellent dynamic balance may be obtained even if a different phase relationship is used between the pistons. The rocking couple will in any case always be 90° out of phase with the vertical imbalance, but it will decrease in magnitude with respect to the vertical imbalance as the piston phase difference approaches the limit, 0°, where the couple disappears entirely. Similarly, the couple will increase in magnitude, and the vertical imbalance will decrease as the phase angle increases toward the other limit, 180°, where the vertical imbalance disappears entirely. The amount of inertial counterbalance mass required for the crankshaft and the counter-rotating balance shaft, and the horizontal position of these shafts, are both determined by the magnitude and position of the vertical imbalance, but the vertical positions of these shafts may be moved at will to offset the rocking couple. Thus, as the piston phase angle approaches 0°, the proper position for the balance shaft approachs coincidence with the crankshaft. As the phase angle approaches 180°, the balance shaft must be moved farther and farther away from the crankshaft, so that their diminishing inertial counterbalance masses will still produce an appropriate equal and opposite rocking couple.

These observations are not specific to the crankshaft geometry described in this invention, but are applicable generally to pistons in parallel cylinders reciprocating sinusoidally at the same frequency but out of phase, by whatever means they may be driven. It is not even necessary that their masses or strokes be the same; there will in any case be a line of balance between them, parallel to their centerlines of reciprocation, that will represent the balance between the product of their respective masses and strokes. On this line it will be possible to position counter-rotating balance shafts to counteract their reciprocating inertial forces, which in all cases can be resolved into a common imbalance acting through the line of balance, and a rocking couple 90° out of phase with said common imbalance.

The balancing method described above is capable of wide application, as will be apparent to those skilled in the art. In the case of Stirling engines, one additional example is offered by the four cylinder double-acting engine with parallel cylinders arranged in a square formation. Twin parallel synchronized crankshafts are connected by conventional connecting rods to the pistons, and they move adjacent pistons with the appropriate 90° phase relationship. Such an engine may be balanced as if it were two sets of twin piston engines, each set with two crankshafts perpendicular to the plane of the cylinder axes. If the crankshafts rotate the same direction, then counterbalance masses attached to them will behave, with respect to the balance method suggested, the same as the mass attached to the single perpendicular crankshaft equidistant between the cylinder axes first described above. Their combined center of inertia will be in the same place with respect to both the vertical and horizontal components as that of the single crank engine the subject of this invention.

As before, only a single additional balance shaft, parallel to the crankshafts, will be necessary to complete the balance of this sort of engine. Moreover, in a parallel square four with 90° phasing on adjacent pistons, the secondary imbalances caused by connecting rod angularity become mutually self-cancelling, thus permitting perfect dynamic balance.

The determination of the positioning of the balance shaft, and the actual counterbalance masses to add to it and the crankshafts, can be generalized as follows, for each set of two pistons.

First, the one must locate the line of balance, which is the line parallel to the cylinders, along which the common reciprocating imbalance (referred to above and below for convenience as the "vertical imbalance") moves. In double-acting Stirling engines, the pistons will generally be of equal mass and move through equal strokes, consequently the line of balance will be equidistant between, and on the same plane, as their cylinder axes.

Secondly, the magnitude of the vertical imbalance must be determined, which may be done by adding the product of the reciprocating mass of one cylinder times its "effective common stroke", with said product of the other cylinder. The "effective common stroke" is the actual stroke of a given reciprocating mass times the cosine of one half the phase angle between the two reciprocating masses.

Once the magnitude of the total vertical imbalance is determined, half of it is counterbalanced on the balance shaft, and the other half on the crankshaft or crankshafts. If their are two crankshafts, as in the example under consideration, they should co-rotate, and an appropriate portion of the counterbalance mass can be attached to each, so that their common effect will act vertically through the line of balance. Obviously, where pistons of equal mass and stroke are involved, then one-fourth of the total vertical imbalance will be counterbalanced on each crankshaft.

The third and final step is to determine the appropriate vertical distance between the crankshaft (or the plane of the crankshafts, in the case of twin crankshafts) and the balance shaft, to counteract the rocking couple component of the piston motion. What we seek is the distance at which our given counter-rotating counterbalance masses will exactly offset the couple formed by the pistons. This distance is most easily expressed as a portion of the distance between the centerlines of the reciprocating masses, or the center distance between cylinders. The proper distance between the balance shaft and the crankshaft or the plane of the crankshafts then equals the tangent of one half the phase angle times the distance between the centerlines of the reciprocating masses.

This method of balancing could be applied to twin crankshaft Stirling engines of any even number of cylinders.

It should perhaps be mentioned by way of simplification that in the case of the specific crankshaft geometry which is the subject of this invention, as opposed to the conventional crank and slider machines as were discussed immediately above, the effective common stroke is the same as the crank throw, and the appropriate vertical distance between crankshaft and balance shaft can alternatively be expressed as the product of cylinder center distance times the ratio of the distances from the point on the yoke at which the rocking lever is attached to (a), the point on the yoke at which either connecting rod is attached, and (b) the point on the yoke to which the crnkpin is attached; provided, the following conditions are met: (a) the rocking lever is attached to the yoke at a point equidistant between the points at which the connecting rods are attached, (b) the crankshaft is equidistant between the cylinder centerlines, and (c) the pistons have equal masses and strokes.

The invention will be explained more fully with reference to the accompanying drawings, which represent two examples thereof.

FIG. 1 shows an end view of the crankshaft mechanism. Piston, 1, operates in the hot cylinder, and is connected by connecting rod, 2, to triangular yoke, 3, at one of its apexes, 4. Piston, 5, operates in the cool cylinder, and is connected by connecting rod, 6, to yoke, 3, at another of its apexes, 7. One end of rocking lever, 8, is connected to yoke, 3, at point, 9, midway between the apexes, 4 and 7. The other end of lever, 8, is pivoted on a pin, 10, fixed to the stationary base of the mechanism. The crankpin of crankshaft, 11, is connected to yoke, 3, at the remaining apex, 12. If a 90° phase relation between the pistons is desired, the crankshaft, 11, should be equidistant between the centerlines of the cylinders in which pistons, 1 and 5, operate, and apexes, 4, 7, and 12, should be equidistant from point, 9. When these conditions are met, as shown in the drawing, the mechanism can be readily balanced by the addition of counter-rotating balance shaft, 13, mounted vertically above the crankshaft at the same distance from it as separates the cylinder axes.

The mechanism could operate in the same fashion upside-down, that is with the yoke, crankshaft, and balance shaft flipped over so the balance shaft is under the crankshaft, and the apexes, 4 and 7, are below apex, 12. In the position shown, the counterbalance shaft and the counterweight on the crankshaft, 11, are exerting their rotating inertial forces downward, counter-acting the net upward vertical inertial forces of the decellerating pistons. In fact, of course, the pistons are moving in opposite directions at different speeds in this position, due to the superimposed effect of the horizontal component of the crankpin motion; however, the influence on the pistons of this horizontal component is at this point without decelleration or accelleration, and therefore involves no additional imbalance.

It is apparent from FIG. 1 that if the distance between apexes 4 and 7 was increased or decreased with respect to the distance between point 9 and apex 12, then the phase relation between the pistons, 1 and 5, (whose centerlines would be changed so as to remain over apexes 4 and 7) would correspondingly increase to more than 90° or decrease to less than 90°. As the phase angle was decreased, the rocking couple would diminish and the vertical imbalance increase; consequently the counterbalance masses attached to the crankshaft and the balance shaft would be increased to counter the larger vertical imbalance, and the distance between these shafts would be decreased to counter the diminished rocking couple. As the phase angle was increased, the distance between the shafts would be increased, and their inertial balance masses would be decreased.

FIG. 2 shows the same mechanism after the crankshaft has moved 90° in its direction of travel. Piston 1 is about half way along its down stroke, while piston 5 is at approximately at its point of highest travel, having moved upward slightly from its position in FIG. 1. With respect to the crankpin, this represents the power stroke. The crankshaft counterweight and the balance shaft are here creating a rocking couple equal and opposite that caused by the yoke's rocking at this position. There is no net vertical imbalance.

FIG. 3 shows the mechanism at its point of maximum volume. While pistons, 1 and 5, appear to be in the same position, piston 1 is actually moving up while piston 5 is completing its down stroke. The balance masses are here combining to counterbalance as they did in FIG. 1, but acting in the opposite direction.

FIG. 4 shows the mechanism 90° beyond FIG. 3, in the midst of its compression stroke. Piston 1 is approximately at its highest point, thus the bulk of the working gas is above the cool piston, 5. The balance situation is analogous to that in FIG. 2.

During the crankshaft revolution, as can be seen from the above described drawings, the motion of yoke apexes, 4 and 7, is approximately linear. The angularity of connecting rods, 2 and 6, is correspondingly negligible, which practically eliminates side forces on the pistons.

FIG. 5 shows schematically the application of the balance system to two cylinders of a square four cylinder twin crankshaft double-acting Stirling engine. Parallel double-acting pistons of equal mass, 14 and 15, reciprocate with equal strokes and a 90° phase difference, along with their respective piston rods, 16 and 17, and crossheads, 18 and 19, with synchronized, parallel, co-rotating crankshafts, 22 and 23. Crankshaft 22 leads crankshaft 23 by 90°, which accounts for the phase difference between pistons 14 and 15. In accordance with the balance method of this invention, and the formula given above, the two pistons are considered together, and their joint motion is resolved into a vertical imbalance and a rocking couple. With the 90° phase angle, the maximum vertical imbalance will be $\sqrt{2}$ times the product of the mass of one piston and its associated reciprocating parts times the actual stroke. This will determine the amount of inertial counterbalance mass required, which will be distributed on the engine shown 50% to the balance shaft, and 25% to each crankshaft. On crankshaft 22 the counterbalance weight, 24, is mounted 135° clockwise from the crankpin, and on crankshaft 23, similar weight, 25, is mounted 225° clockwise from the crankpin. Since these crankshafts co-rotate, the weights, 24 and 25, co-operate as if on a co-rotating shaft directly between the crankshafts. Balance shaft, 26, with counterbalance weight, 27, attached, is parallel to the crankshafts 22 and 23 and above the crankshaft plane a distance equal to the distance that separates the cylinder centerlines. It is synchronized to the crankshafts by gears or positive belt drive, so as to counter-rotate at the same angular velocity as the crankshafts. In the positions shown, all counterbalance weights are exerting their maximum inertial forces vertically downward, to counteract the pistons' combined upward vertical imbalance. There is no rocking couple at this position.

FIG. 6 shows the engine in FIG. 5 after 90° of additional crankshaft rotation. At this point, there is no vertical imbalance, but the rocking couple of the pistons is at its maximum. The counterbalance weights are positioned appropriately to counteract this couple, forming an equal and opposite couple of their own.

FIG. 7 shows the engine in FIG. 5 after 180° of crankshaft rotation. The balance situation is analogous to, but the opposite of, that in FIG. 5.

FIG. 8 shows the engine in FIG. 5 after 270° of crankshaft rotation, where the balance situation is analogous to, but the opposite of, that in FIG. 6.

What I claim is:

1. A balance mechanism for a Stirling engine of the type which has two parallel cylinders and a yoke and which has a first piston reciprocating in one of said cylinders and a second piston reciprocating in the other of said cylinders, and which has a first connecting rod one end of which is rotatably attached to said first piston and the other end of which is rotatably attached to said yoke at a first point, and which has a second connecting rod one end of which is rotatably attached to said second piston and the other end of which is rotatably attached to said yoke at a second point, and which has a rocking lever one end of which is rotatably attached to a stationary pin and the other end of which is rotatably attached to said yoke at a third point equidistant between and on a line with said first and second points on said yoke, and which has a crankshaft with a single crankpin, which crankshaft is located equidistant between the extended axes of the two parallel cylinders, and which crankshaft rotates on an axis perpendicular to the plane on which said cylinder axes lie, and the crankpin of said crankshaft is rotatably attached to said yoke at a fourth point on said yoke which is equidistant from said first and second points and at a distance from said third point, and with the first piston constructed of such mass as will make the total reciprocating masses associated with one cylinder equal to the total reciprocating masses associated with said other cylinder, said balance means comprising;

(a) counterbalance weight means attached to the crankshaft and rotating with it, exerting an inertial force radially opposite the crankpin of said crankshaft and in the same plane of rotation, said force being identical to that which would be exerted by a mass, equal to the reciprocating masses associated with one cylinder, rotating at the same angular velocity and at the same distance from the center of rotation as said crankpin, and;

(b) a counterbalance shaft counter-rotating at the same angular velocity as said crankshaft, on an axis parallel to that of said crankshaft and on the opposite side of said yoke from said crankshaft at a distance from said crankshaft equal to the product of the distance between the inertial centerlines of said reciprocating masses times the ratio of the distances on the yoke between said third point where the rocking lever is attached and said first point where the first connecting rod is attached, divided by the distance between said third point where the rocking lever is attached and said fourth point where the crankpin is attached, said counterbalance shaft balanced so as to exert equal radial inertial force, on the same plane, as said counterbalance weight means, and;

(c) drive means for driving and synchronizing said crankshaft and said counterbalance shaft so they counter-rotate with equal angular velocity and their radial inertial forces act simultaneously in the same direction only on a line intersecting their respective axes of rotation.

2. A crankshaft mechanism, as recited in claim 1 where the counterbalance weight means comprises weights attached to the crankshaft opposite the crankpin.

3. A balance mechanism for dynamically balancing the inertial forces of two masses reciprocating sinusoidally with the same frequency but with a phase difference along parallel centerlines, comprising:

(a) first balance shaft means rotating at the frequency of reciprocation on an axis perpendicular to the plane of the centerlines of reciprocation, said axis intersecting said plane at a point on the line of balance which is parallel to, and on the same plane as, the centerlines of reciprocation, said line of balance positioned between said centerlines so that the product of the distance of said line of balance from the first centerline of reciprocation times the mass and times the stroke of the mass reciprocating on said first centerline, is equal to the product of the distance of said line of balance from the second centerline of reciprocation times the mass and times the stroke of the mass reciprocating on said second centerline, said first balance shaft means containing sufficient counterbalance weight to balance, on the plane of the centerlines of reciprocation, one-half of the sum of the following inertial forces at any given equal angular velocity;

(1) A first weight, equal in mass to the mass of the first of the said two reciprocating masses, said first weight rotating at a diameter equal to the product of the stroke of said first reciprocating mass times the cosine of one-half of the phase angle between the said reciprocating masses; and, (2) A second weight, equal in mass to the mass of the second of the said two reciprocating masses, said second weight rotating at a diameter equal to the product of the stroke of said second reciprocating mass times the cosine of one-half of the phase angle between the said reciprocating masses;

(b) second balance shaft means counter-rotating at the same angular velocity as said first balance shaft means, said second balance shaft means having similar inertial counterweight acting radially in the same plane of rotation as said first balance shaft means, and the effective axis of said second balance shaft means being parallel to that of said first balance shaft means and intersecting said line of balance at a distance from the axis of said first balance shaft means equal to the product of the distance between the centerlines of said two reciprocating masses times the tangent of one-half of the phase angle between said reciprocating masses, and;

(c) drive means for driving and synchronizing said first and second balance shaft means so that their radial inertial forces act simultaneously in one direction along said line of balance at the same time as the two reciprocating masses co-operate to produce the maximum opposite inertial force along said line of balance.

4. A balance mechanism, as recited in claim 3, where said first balance shaft means comprises a rotatable shaft with a counterweight attached radially thereto.

5. A balance mechanism, as recited in claim 4, where the second balance shaft means comprises a rotatable shaft with a counterweight attached radially thereto.

6. A balance mechanism as recited in claim 4, where the second balance shaft means comprises two parallel balance shafts, with equal counterweights attached to each shaft, said balance shafts synchronized to turn in the same direction and to maintain their counterweights at equal angles with respect to the plane in which said balance shafts lie, said balance shafts thereby cooperating to produce an effective inertial axis equidistant between their actual axes.

* * * * *